(12) United States Patent
Stosz et al.

(10) Patent No.: US 6,591,111 B1
(45) Date of Patent: Jul. 8, 2003

(54) GROUP RADIO COMMUNICATION SYSTEM AND METHOD USING INTERCONNECTED RADIO SUB-NETWORKS

(75) Inventors: Jonathan David Stosz, Gilbert, AZ (US); Rhett Garrett Hayden, Scottsdale, AZ (US); Dean Paul Vanden Heuvel, Chandler, AZ (US); Charles Joseph Ganucheau, Jr., Mesa, AZ (US); Scott David Blanchard, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,319

(22) Filed: Dec. 10, 1999

(51) Int. Cl.[7] .................................................. H04Q 7/20
(52) U.S. Cl. ...................................... 455/518; 455/519
(58) Field of Search ............................... 455/426, 427, 455/428, 429, 430, 446, 516, 520, 507, 560, 524, 526, 517, 518, 11.1, 12.1, 519; 370/230, 400, 401, 402, 404, 405, 408

(56) References Cited

U.S. PATENT DOCUMENTS

| | | | | |
|---|---|---|---|---|
| 5,283,817 A | * | 2/1994 | Hara et al. ................... | 455/463 |
| 5,457,809 A | | 10/1995 | Ohnishi | |
| 5,566,388 A | | 10/1996 | Brame et al. | |
| 5,835,485 A | * | 11/1998 | Grube et al. ................ | 370/312 |
| 6,023,467 A | * | 2/2000 | Abdelhamid et al. .... | 370/236.2 |
| 6,208,619 B1 | * | 3/2001 | Takeuchi ................... | 370/229 |
| 6,272,334 B1 | * | 8/2001 | Rao ............................ | 455/418 |
| 6,301,263 B1 | * | 10/2001 | Maggenti .................... | 370/462 |
| 6,408,179 B1 | * | 6/2002 | Stosz et al. ................. | 455/428 |
| 6,466,554 B2 | * | 10/2002 | Okada ........................ | 370/312 |

FOREIGN PATENT DOCUMENTS

| | | |
|---|---|---|
| NL | 1007425 | 1/1998 |
| WO | WO 98/47269 | 10/1998 |
| WO | WO 99/49686 | 9/1999 |

* cited by examiner

*Primary Examiner*—Dwayne Bost
*Assistant Examiner*—Jean A. Gelin
(74) *Attorney, Agent, or Firm*—Frank J. Bogacz

(57) ABSTRACT

A group radio communication system (20) includes a group controller (24) which communicates through a satellite-based packet switched data communication network (22) to converters (28). The converters (28) are located within radio coverage areas (36) of various radio sub-networks (26). Each radio sub-network (26) includes a base station (32), controller (30) and any number of subscriber radios. The controllers (30) manage point-to-multipoint communications between subscriber radios (34) within their radio sub-networks (26), and the group controller (24) manages point-to-multipoint communications between radio sub-networks (26). The converters (28) translate between protocols (38, 38') established for communications within specific radio sub-networks (26) and a protocol (56) established for communication over the packet switched data communication network (22). The group controller (24) duplicates and distributes packets (118) originating in one radio sub-network (26) to other radio sub-networks (26).

17 Claims, 5 Drawing Sheets

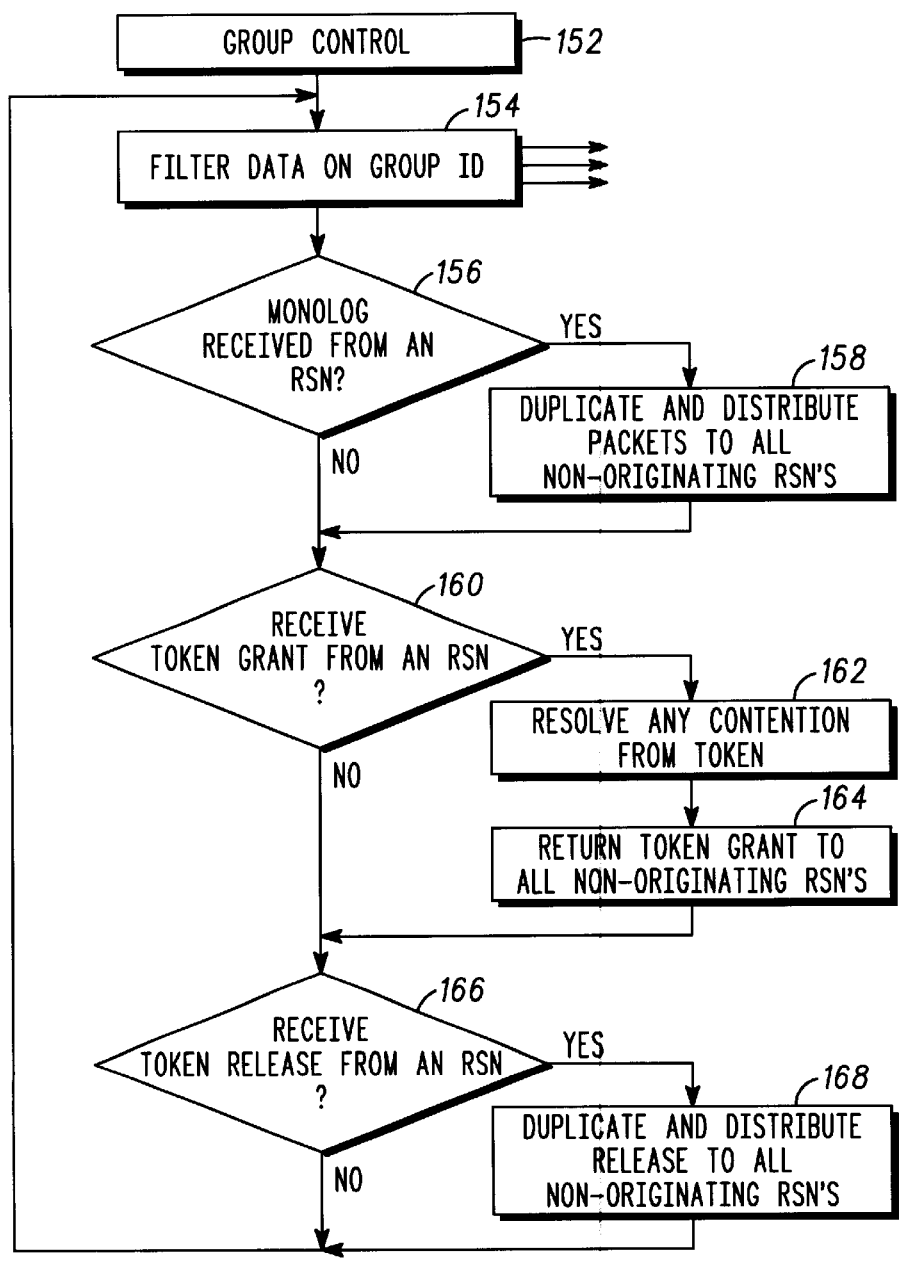

GROUP RADIO COMMUNICATION SYSTEM AND METHOD USING INTERCONNECTED RADIO SUB-NETWORKS

TECHNICAL FIELD OF THE INVENTION

This invention relates to a group radio communication system which implements point-to-multipoint communications. More specifically, the present invention relates to independent radio sub-networks each of which implement point-to-multipoint communications within their domains and are coupled together through a group controller to form an overall network for point-to-multipoint communications.

BACKGROUND OF THE INVENTION

Point-to-multipoint (PTM) refers to a communication circuit in which a single signal goes from one originating group member to many destination or target group members. PTM communication can be implemented by sharing common communication resources among many users. PTM communication has been long practiced in connection with commercial broadcast radio and television, where the origination point remains static and the communication resources are allocated for very long durations. However, the origination point may also shift, as occurs in two-way and dispatch radio.

A PTM communication session may take place for an indefinite period of time on the scale of weeks, months, or years, for several hours, or for a shorter duration. Within a PTM communication session, a point-to-multipoint monolog occurs when one group member is originating information that is being broadcast to the other members of the group. The duration of a monolog is desirably controlled by the group member originating the monolog. When the originator ceases to originate information, the monolog ceases. Desirably, that group member or other group members may originate another monolog thereafter within the same communication session; however, nothing requires any group member to originate a monolog at any given instant. For voice communications, a monolog typically lasts only a few seconds, although nothing requires any particular duration.

One problem with existing group radio communication systems that provide PTM communication sessions is their frequent failure to use existing communication infrastructures efficiently, resulting in increased costs, limited coverage areas, and limited ability to extend the group to cover additional members. Existing communication infrastructures, and particularly cellular radio infrastructures, are typically configured to optimize the delivery of point-to-point (PTP), as opposed to PTM, communications. However, infrastructure costs are typically low on a per-user basis because they are shared by a vast number of users, and the coverage area may be up to world wide.

Another problem is that conventional group radio systems are often incompatible with one another due to system incompatibilities or remote locations. Thus, one group system, such as a city police department, may not be able to participate in a common group communication session with another group system, such as a federal agency, even when located in the same area. Due to limited coverage areas, even members of compatible systems, such as police departments in different towns, may not be able to participate in a common group communication session

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 7 shows an exemplary data format diagram of a packet transported within the packet switched network of the group radio communication system; and FIG. 8 shows a flow chart of a group control process performed by a group controller portion of the group radio communication system.

DETAILED DESCRIPTION OF A PREFERRED EMBODIMENT

Figure 1:
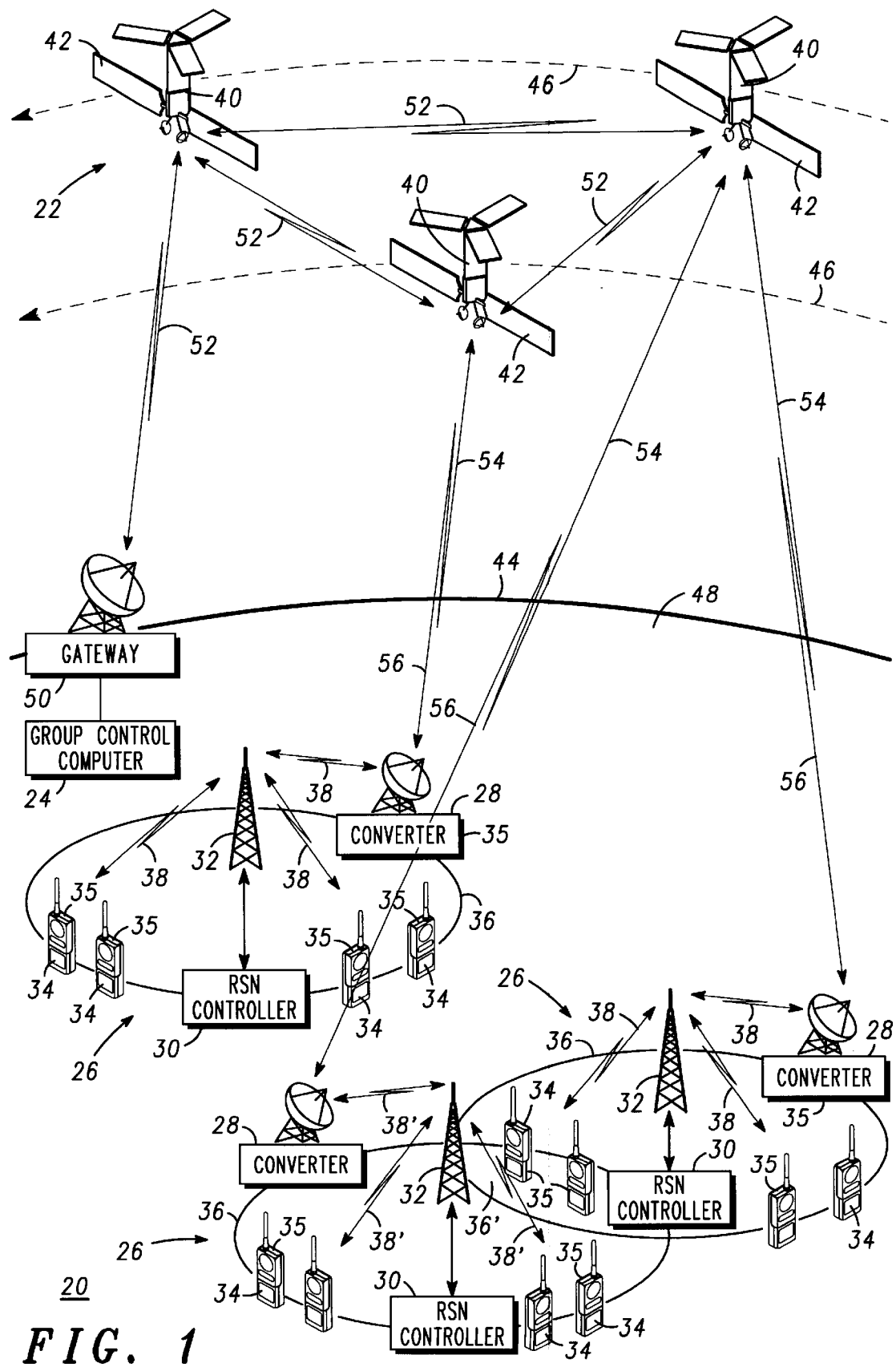
FIG. 1 shows a layout diagram of a group radio communication system configured in accordance with the teaching of the present invention.

FIG. 1 shows a layout diagram of a group radio communication system 20 configured in accordance with the teaching of the present invention. System 20 includes a data communication network 22 which is coupled to a group controller 24 and any number of radio sub-networks 26.

Each radio sub-network 26 includes a converter 28, a radio sub-network (RSN) controller 30, a base station 32, and any number of subscriber radios 34. Radio sub-networks 26 communicate with data communication network 22 through their converters 28. Each converter 28 communicates with its own radio sub-network (RSN) controller 30 through the base station 32 for the radio sub-network 26. Subscriber radios 34 also communicate with the controller 30 for their radio sub-network 26 through the base station 32 for the radio sub-network. Subscriber radios 34 and converter 28 communicate through their base station 32 with their controller 30 using a common over-the-air communication protocol 38, 38' established for that radio sub-network 26.

Controllers 30 for each radio sub-network 26 may be implemented using conventional computer technology (not shown), including, for example, a processor unit, a memory unit, a hard drive unit, I/O units such as video display, keyboard, mouse, and the like, and an interface to base station 32.

The subscriber radios 34 for each radio sub-network 26 are located within a radio coverage area 36 for that radio sub-network 26. Radio coverage areas 36 may be remotely located from one another or may overlap, as shown in area 36'. In the preferred embodiment, radio coverage areas 36 may be located substantially anywhere in the world, on or near the surface of the earth.

Nothing requires protocols 38, 38' to be compatible. In the embodiment depicted in FIG. 1, protocol 38' is incompatible with protocol 38. Accordingly, even subscriber radios 34 residing in overlap coverage area 36' communicate only with the base station 32 and controller 30 for their own radio sub-network 26 because of incompatible protocols 38 and 38'. Likewise, nothing requires protocols 38, 38' to be incompatible. Subscriber radios 34 residing in remotely located, non-overlapping coverage areas 36 which share a compatible protocol 38 communicate only with the base station 32 and controller 30 for their own radio sub-network 26 because these subscriber radios 34 are beyond the radio range of the other radio sub-network 26. Although potentially incompatible, protocols 38 and 38' are collectively referred to below simply as protocol 38 for convenience.

With the exception of converters 28, radio sub-networks 26 may be provided by substantially conventional radio sub-networks which are configured to provide group or point-to-multipoint (PTM) communications. In PTM communications, one subscriber radio 34 originates a transmission, referred to as a monolog herein, which is broadcast to other subscriber radios 34 in the group. The originating subscriber radio 34 is called a monolog originator, and each of the other subscriber radios 34 to which the monolog is broadcast is a monolog target. The target of one monolog may originate a subsequent monolog. From the perspective of a single radio sub-network 26, the group includes one or more of converter 28 and the subscriber radios 34 included in the radio sub-network 26. Conventional radio sub-networks which would suitably serve as radio sub-networks 26 in group radio communication system 20 are those radio sub-networks used for dispatching purposes by police, fire and other civic organizations and by military and businesses. One example of such a radio sub-network is commercially available from the Motorola Corporation under the trade name iDEN®.

Group radio communication system 20 extends the group size for radio sub-networks 26 beyond that achievable with any single radio sub-network 26. The group size is extended in one embodiment to encompass remotely located radio sub-networks 26 and is extended in another embodiment to encompass a co-located radio sub-network 26 operating on an incompatible protocol 38'. The group size is extended through communications provided by data communication network 22.

Data communication network 22 is a packet switched network. In other words, rather than allocating resources to a circuit or call in a call-setup process and de-allocating those resources so that they can be used elsewhere in a subsequent circuit or call, as occurs in a circuit switched network, network 22 merely includes addressing information in data packets and sends the addressed data packets into network 22 for delivery to their intended destinations on a packet-by-packet basis. Network resources are not consumed as a result of identifying ends of a communication path and are not consumed when no packets require delivery.

In the preferred embodiment, data communication network 22 is provided by a plurality of base stations or switching nodes 40 implemented in a constellation of satellites 42 which orbit the Earth 44 in low earth orbits 46. In one embodiment, satellites 42 may be similar or equivalent to satellites which provide commercially available telecommunication services under the trade name of IRIDIUM®. Switching nodes 40 are in radio communication with each other and with one or more terrestrially-located gateways 50 (one shown) through various wide band RF cross links 52. In the preferred embodiment, group controller 24 couples to gateway 50, at which point group controller 24 has access to data communication network 22. Group controller 24 may be implemented using conventional computer technology (not shown), including, for example, a processor unit, a memory unit, a hard drive unit, I/O units such as video display, keyboard, mouse, and the like, and an interface to gateway 50.

Switching nodes 40 are configured to project antenna beams 54 toward the surface of the earth. Beams 54 provide data communications through any number of channels using an over-the-air protocol 56 which may be incompatible with protocols 38 practiced in radio sub-networks 26. In accordance with the preferred embodiment, each channel of each beam 54 provides a relatively low bandwidth communication link with switching node 40 compared to wide band communication links 52, but each switching node 40 supports many more of such low bandwidth links than it supports in cross links 52. Of course, data communication network 22 may communicate with numerous other devices (not shown) in addition to gateways 50 and converters 28. Moreover, such other devices may communicate in a packet switched or circuit switched manner.

The use of a space-based data communication network 22 is desirable because it allows converters 28 of radio sub-networks 26 to be located substantially anywhere on or near the surface of the Earth, whether or not a terrestrial communication network is also available. Thus, group radio communication system 20 may deliver world-wide coverage if needed, even when some of radio sub-networks 26 are remotely located in areas unavailable to the public switched telecommunications network. However, in an alternative embodiment, data communication network 22 may be provided by the Internet, and substantially world-wide coverage is also provided, if needed. Of course, data communication network 22 could also be provided by a combination of the Internet and a space-based network.

Converters 28 of radio sub-networks 26 translate between protocols 38 and 56 in a manner discussed below. Hence, PTM signaling and monolog information generated in each radio sub-network 26 is translated, packetized, and addressed to group controller 24 by converters 28 and delivered to group controller 24 through data communication network 22. Group controller 24 manages a global PTM communication session between radio sub-networks 26 by exchanging signaling with the various radio sub-networks 26 in group radio communication system 20 and by duplicating monolog information received from an originating radio sub-network 26 and distributing it to target sub-networks 26. Such a PTM communication session is considered a global session because it has a scope beyond a local PTM communication session taking place within a single radio sub-network 26. Nothing requires the PTM communication session to be geographically extended world wide.

Figure 2:
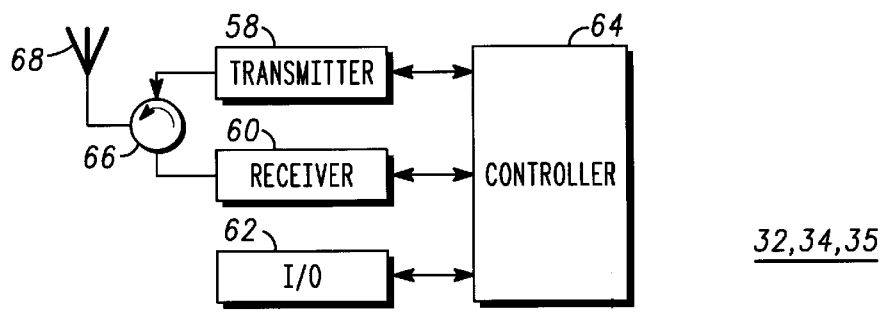
FIG. 2 shows a block diagram which describes a variety of subscriber radios and a variety of radio sub-network base stations usable in the group radio communication system.

FIG. 2 shows a block diagram which describes a variety of subscriber radios 34 and a variety of radio sub-network (RSN) base stations 32 usable in group radio communication system 20. While structural, design, and other differences between base stations 32 and subscriber radios 34 are certainly desirable, those skilled in the art will appreciate that such differences are not critical to the present invention.

Base stations 32 and subscriber radios 34 each include a transmitter 58, receiver 60, input and output (I/O) section 62, and a controller 64. An output of transmitter 58 and an input of receiver 60 each couple to a circulator 66 (coupling network), which also couples to an antenna 68.

Controller 64 couples to transmitter 58, receiver 60, and I/O section 62 both to transfer data and to provide control. For example, controller 64 provides data to transmitter 58 and influences the power level, frequency, timing, and/or coding at which transmitter 58 transmits in accordance with protocols 38 (FIG. 1). The data provided to transmitter 58 may be obtained through I/O section 62 and processed in controller 64, for example to vocode, encrypt, and/or apply error correction.

Likewise, controller 64 establishes the FDMA, TDMA and/or CDMA tuning applied to receiver 60. Controller 64 also receives data from receiver 60 and passes such data to I/O section 62, possibly after processing in controller 64, for example to de-vocode, decrypt, and/or remove error correction. I/O section 62 includes any data port, microphone, loudspeaker, display, keypad, or other I/O device conventional in the art of computerized radio devices.

Figure 3:
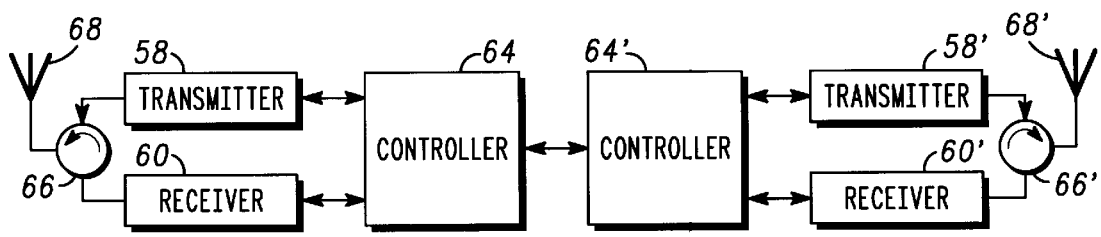
FIG. 3 shows a block diagram of a converter portion of the group radio communication system.

FIG. 3 shows a block diagram of a typical converter 28. In the embodiment depicted in FIG. 3, converter 28 is configured as two subscriber units 34 (FIG. 2). In particular, the transmitter 58, receiver 60, controller 64, circulator 66 (coupling network), and antenna 68 are provided and operated so as to appear as another subscriber unit 34 in the radio sub-network 26 in which it is used. In addition, converter 28 includes a network transmitter 58', a network receiver 60', a network controller 64', a circulator 66' (coupling network), and an antenna 68', coupled together substantially as described above for subscriber radio 34, but configured to communicate over channels 54 (FIG. 4) using protocol 56 with data communication network 22. Accordingly, converter 28 may appear as any other device operating on data communication network 22. Controllers 64 and 64' couple together to link the radio sub-network 26 and data communication network 22 interfaces together. An I/O section is not depicted in FIG. 3, but may be included.

Since converters 28 appear as another subscriber radio 34 within their radio sub-network 26, converters 28 and subscriber radios 34 for a radio sub-network 26 are collectively referred to as local group members 35 (FIG. 1) below.

Figure 4:
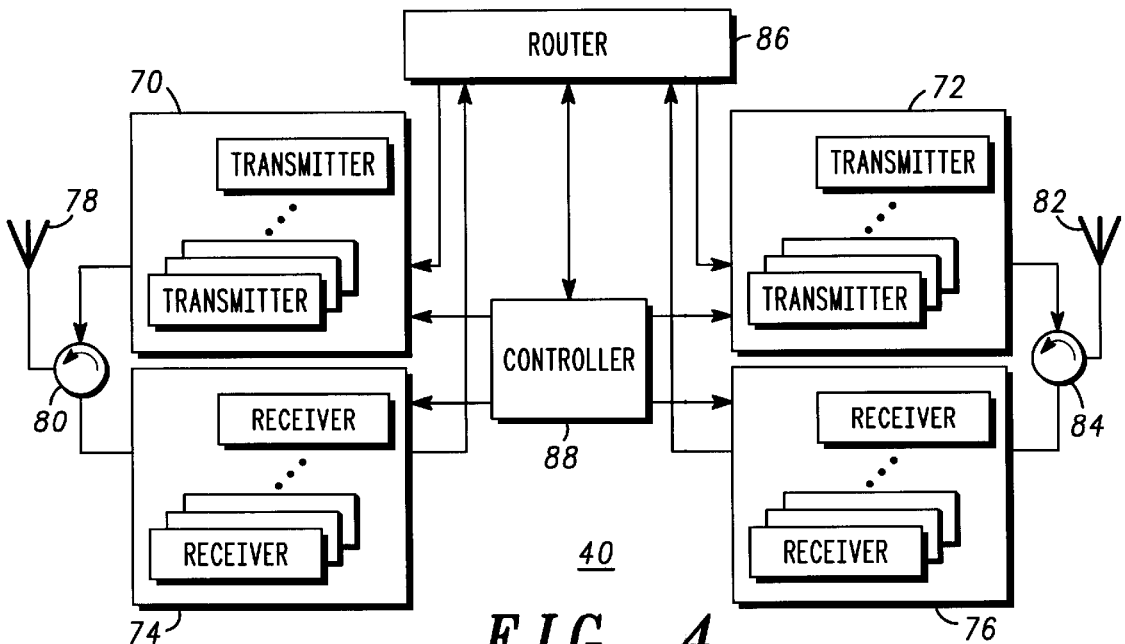
FIG. 4 shows a block diagram of a packet switched network node portion of the group communication radio system.

FIG. 4 shows a block diagram of an exemplary switching node 40. Switching node 40 includes transmitter blocks 70 and 72 and receiver blocks 74 and 76. Transmitter block 70 includes a plurality of individual transmitters that transmit over forward links in the beams 54 supported by switching node 40. Receiver block 74 includes a plurality of individual receivers that receive over reverse links the beams 54 supported by switching node 40. The transmitters and receivers of blocks 70 and 74 may share one or more antennas 78 through a coupling network 80. Transmitter block 72 and receiver block 76 include individual transmitters and receivers, respectively, to transmit over cross links 52 (FIG. 1). The transmitters and receivers of blocks 72 and 76 may share one or more antennas 82 through a coupling network 84.

Each transmitter and each receiver of each block 70, 72, 74 and 76 couples to a router 86. A controller 88 couples to router 86 and to blocks 70, 72, 74, and 76. Data, preferably in the form of data packets, are received at receivers in blocks 74 and 76 and presented to router 86. Under the control of controller 88, these data packets are then switched to specified transmitters in transmitter blocks 70 and 72 for transmission out of switching node 40. Accordingly, switching node 40 performs a switching function as well as transmitting and receiving functions.

Figure 5:
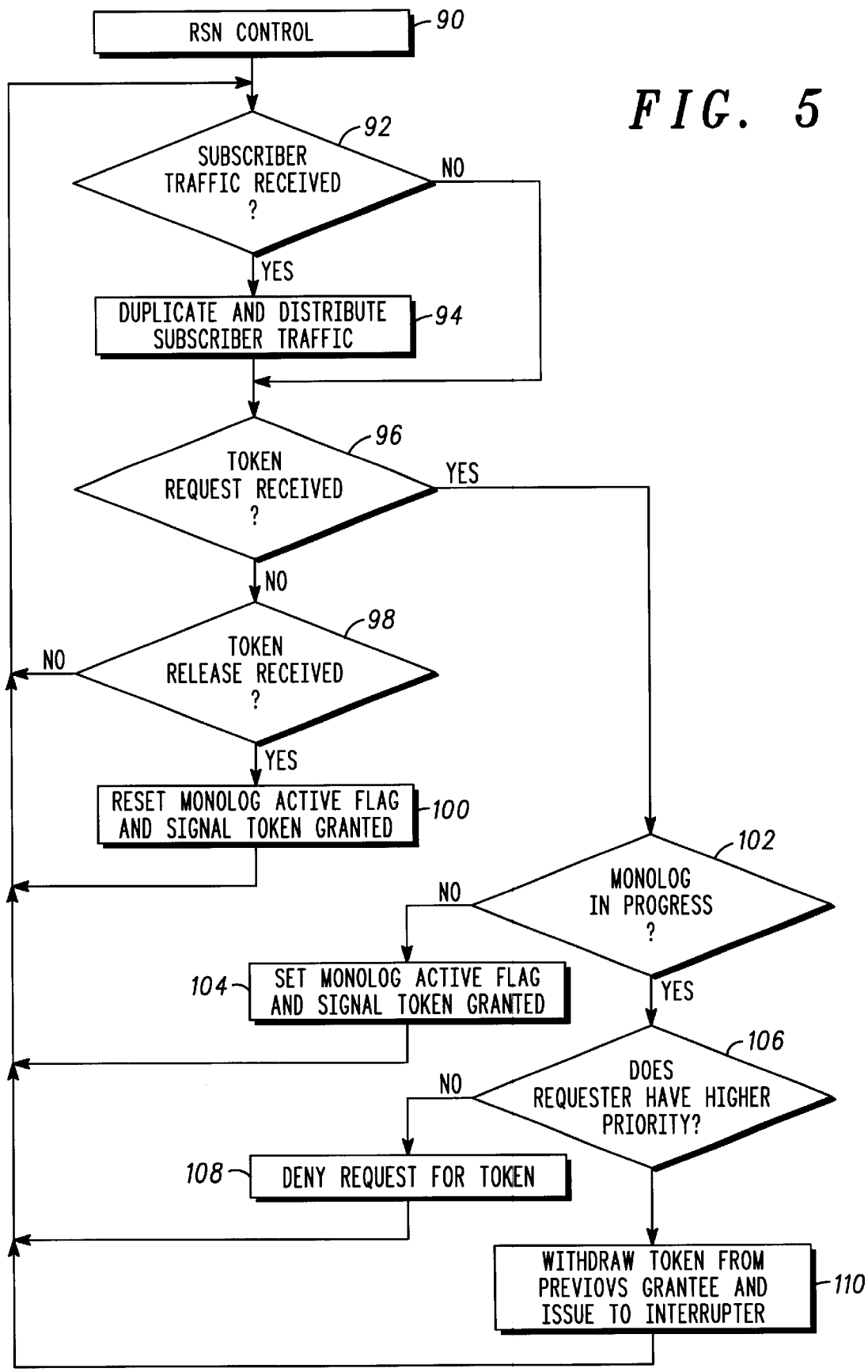
FIG. 5 shows a flow chart of a radio sub-network control process performed by radio sub-network base stations in the group radio communication system.

FIG. 5 shows a flow chart of an RSN control process 90 performed by RSN controllers 30 with respect to base stations 32 (FIG. 1). The RSN control process 90 performed at each RSN controller 30 provides point-to-multipoint communication session management services for group members 35 within the same radio sub-network 26 as the RSN controller 30. In particular, process 90 is carried out by each RSN controller 30 in response to computer software stored in a memory portion (not shown) of controller 30 and executed by a processor portion (not shown) of controller 30. Each controller 30 in group radio communication system 20 may simultaneously execute processes similar to process 90. Of course, controllers 30 and base stations 32 may perform other processes concurrently with process 90.

Process 90 includes a query task 92 which determines whether subscriber traffic has been received at base station 32 in accordance with protocol 38 (FIG. 1). Such subscriber traffic may be received from a local group member 35 (FIG. 1). The subscriber traffic is a signal or signals which are configured to convey a PTM monolog being originated at a subscriber radio 34 within the radio sub-network 26 controlled by RSN control process 90 or originated outside the radio sub-network 26 controlled by RSN control process 90 and provided through converter 28.

If subscriber traffic is detected, a task 94 duplicates and distributes the subscriber traffic locally. In other words, the subscriber traffic is duplicated to the extent necessary for all local group members 35. Then task 94 performs subscriber traffic distribution to all local group members 35 for which the subscriber traffic is intended by causing base station 32 to transmit the subscriber traffic to local group members 35 in the radio sub-network 26. For the purposes of task 94, converter 28 may or may not be included in the group to which subscriber traffic is distributed. The subscriber traffic is distributed in a format consistent with the protocol 38 established for the radio sub-network 26. If the group has been set up to include subscriber radios 34 outside the radio sub-network 26 from which a monolog is originating, then the group is set up to include converter 28 from the perspective of process 90 and task 94. Nothing requires packetizing subscriber traffic at task 94.

Following task 94 and when task 92 fails to find incoming subscriber traffic, a query task 96 is performed to determine whether a token request has been received. A token is a intangible construct used to manage a PTM communication session. In general, it represents the permission to be the origination point for a point-to-multipoint monolog. In the preferred embodiment, only one local group member 35 may originate a monolog at a time. If the token is not currently granted, i.e., if no monolog is active, then any, in the usual mode of operation, local group member 35 may request and be granted a token. However, if the token has been granted to a local group member 35, i.e. a local group member 35 is originating a monolog from the perspective of process 90, then the token cannot be issued to another local group member 35 until the token is released by that originating local group member 35. The request for a token is routed to controller 30 by signaling when, for example, a subscriber pushes a push-to-talk (PTT) button in I/O section 62 (FIG. 2) on the subscriber's radio 34. A granted token may be released when the subscriber releases the PTT button.

When task 96 fails to detect a request for a token, a query task 98 determines whether a token release has been received. The release of a token is indicated through signaling routed to controller 30 when, for example, a subscriber releases a push-to-talk (PTT) button in I/O section 62 (FIG. 2) on the subscriber's radio 34. However, if no token release is detected in task 98, the program flow loops back to task 92 to continue process 90.

When task 98 discovers a token release, the end of a monolog by a local monolog originator is being signaled, and a task 100 is performed. Task 100 resets a monolog active flag to indicate the completion of the monolog, and signaling indicating that the token has been released is transmitted to group members within the radio sub-network 26. As will be discussed below, the token release signaling can be transmitted through converter 28 to group controller 24 (FIG. 1) and to other radio sub-networks 26 which may be included in the group. After task 100, program flow loops back to task 92 to continue process 90.

When task 96 discovers a token request, an intention to originate a monolog is being signaled, and a query task 102 is performed. Task 102 resolves conflicts between concurrent requests from local group members 35 for a token. In particular, task 102 determines whether a monolog is currently in progress. Task 102 may be performed by referring to the above-discussed monolog active flag. If the flag is reset, then no monolog is in progress. When no monolog is in progress, a task 104 sets the monolog active flag and signals the grant of the token. The grant of the token is signaled by transmitting signaling locally within the radio sub-network 26. This signaling can, if converter 28 is included in the group, be received at converter 28 and passed on to group controller 24 (FIG. 1). After task 104, program flow loops back to task 92 to continue process 90.

When task 102 determines that a token request has been received while a monolog is ongoing, a query task 106 is performed to determine whether the most recent requester has a higher priority than the local group member 35 currently originating the monolog. In the preferred embodiment, the highest priority is assigned to converter 28. Thus, a token request coming through converter 28 may override a local monolog, but no local monolog will override a monolog being originated from outside a given radio sub-network.

If task 106 finds that the requester does not have a higher priority than the local group member 35 to which a token is currently granted, then a task 108 denies the token request in an appropriate manner which may include the transmission of signaling or simply by ignoring the request. After task 108, program flow loops back to task 92 to continue process 90.

When task 106 finds that the requester has a higher priority than the local group member 35 to which a token is currently granted, then a task 110 is performed to withdraw the token from the previous token grantee and issue the token to the interrupter. The token may be withdrawn and reissued through appropriate signaling. After task 110, program flow loops back to task 92 to continue process 90.

Figure 6:
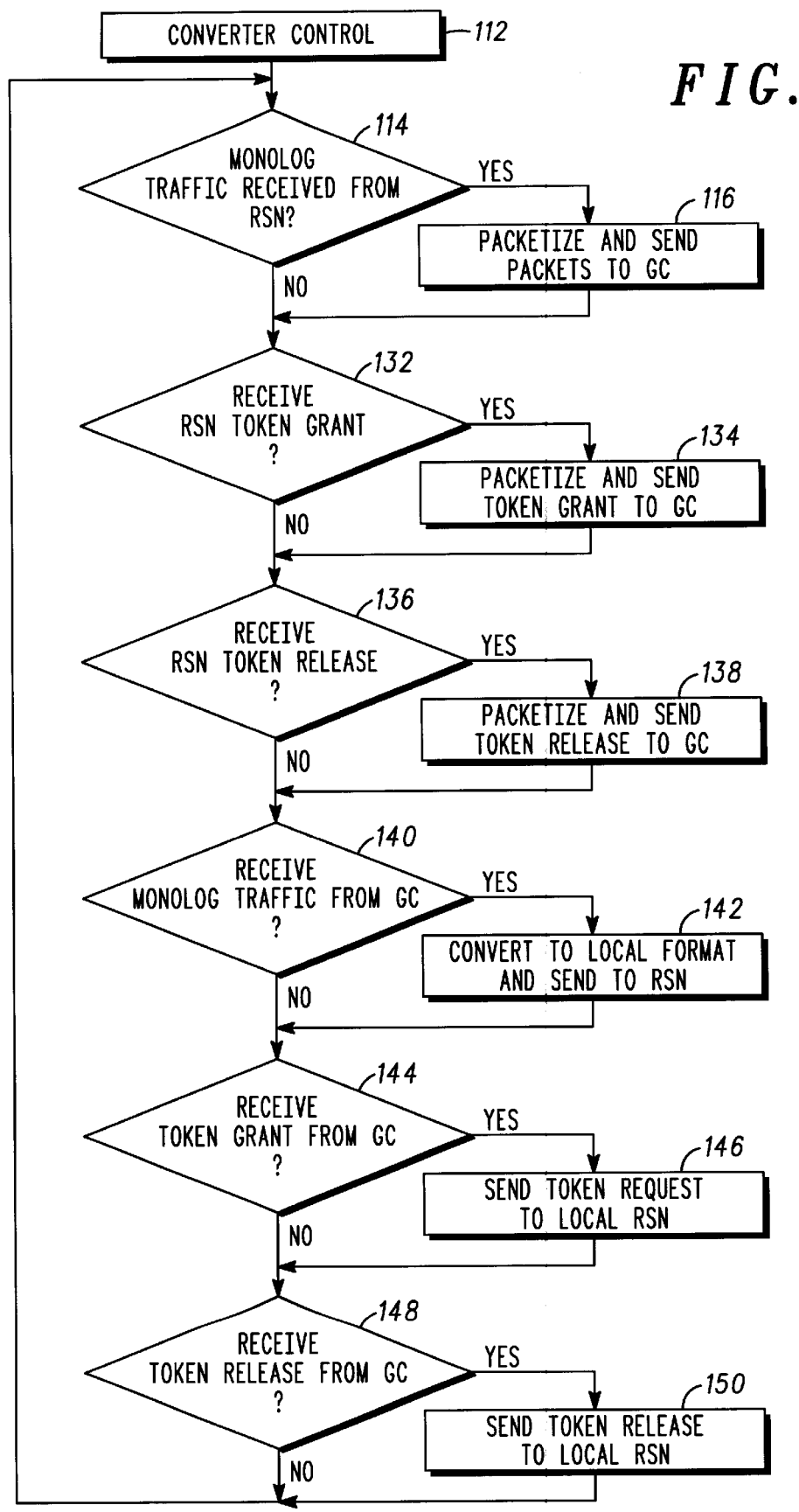
FIG. 6 shows a flow chart of a converter control process performed by converters in the group radio communication system.

FIG. 6 shows a flow chart of a converter control process 112 performed by converters 28 in group radio communication 20 (FIG. 1). In particular, process 112 is carried out between controllers 64 and 64' of a converter 28 in response to computer software stored in a memory portion (not shown) of controllers 64, 64' and executed by a processor portion (not shown) of controllers 64, 64'. Each converter 28 in group radio communication system 20 may simultaneously execute processes similar to process 112. Of course, converters 28 may perform other processes concurrently with process 112.

Converter control process 112 includes a query task 114 which determines if monolog traffic has been received from a local radio sub-network 26. Such monolog traffic will be received in accordance with protocol 38 (FIG. 1). If monolog traffic is detected, then a task 116 is performed to convert and packetize the monolog traffic into a format suitable for use in connection with protocol 56 (FIG. 1).

FIG. 7 shows an exemplary data format diagram of a packet 118 transported within data communication network 22 (FIG. 1) of the group radio communication system 20 (FIG. 1). Packet 118 may include certain network header data 120 which, for example, conveys routing information and status information and is used by data communications network 22. Fields 122 and 124 of packet 118 may be reserved for data identifying the target address and origination address of the packet. Fields 126 and 128 may be configured as data identifying a group ID and a status bit indicating whether the packet conveys signaling or monolog traffic. In addition, a field 130 may be reserved for subscriber radio data, such as monolog traffic or signaling data.

In one embodiment, task 116 sets field 122 to indicate an address for group controller 24 and field 124 is set to indicate the address of the radio sub-network 26 from which packets 118 originate. Fields 126, 128 and 130 are populated accordingly. In another embodiment, task 116 completes fields 126, 128 and 130, and network nodes 40 (FIG. 1) complete fields 122 and 124. In FIG. 6, after task 116, and when task 114 fails to detect received monolog traffic, program flow continues to a query task 132.

Task 132 determines whether converter 28 has received signaling from its local radio sub-network 26 indicating that a token has been granted. If a token grant is detected, a task 134 is performed to translate the signaling signal and otherwise packetize the token grant in accordance with packet 118 and send the token grant over data communication network 22 to group controller 24.

After task 134 and when task 132 fails to detect a token grant from its local radio sub-network, program flow continues to a query task 136. Task 136 determines whether converter 28 has received signaling from its local radio sub-network 26 indicating that a token has been released. If a token release is detected, a task 138 is performed to translate the signaling signal and otherwise packetize the token release in accordance with packet 118 and send the token release over data communication network 22 to group controller 24.

After task 138 and when task 136 fails to detect a token release from its local radio sub-network, a query task 140 is performed to determine if converter 28 has recently received a monolog traffic packet from group controller (GC) 24. Monolog traffic packets will be received in accordance with protocol 56 (FIG. 1) and packet format 118. If monolog traffic from group controller 24 is detected, then a task 142 is performed to translate the packetized monolog traffic into a form suitable for use in connection with the protocol 38 or 38' (FIG. 1) established for the local radio sub-network 26. In addition, the monolog traffic is transmitted into the local radio sub-network 26, and particularly to base station 32 and controller 30, whereupon it is duplicated and transmitted to local subscriber radios 34 as discussed above in connection with FIG. 5.

Following task 142 and when task 140 fails to detect monolog traffic packets from group controller 24, a query task 144 is performed to determine if converter 28 has recently received a token grant from group controller 24. In the preferred embodiment, a token grant from group controller 24, when received at a converter 28, indicates that group controller 24 has granted the token to a radio sub-network 26 other than the one in which converter 28 is located. In this situation, a task 146 converts the token grant message into signaling appropriate to serve as a token request within protocol 38, and transmits the token request to the local radio sub-network 26, where it is received by base station 32 and controller 30. As discussed above in connection with FIG. 5, a token request from converter 28 is given highest priority in the preferred embodiment and will result in preventing the token from being locally granted to a local subscriber radio 34 by controller 30. On the other hand, it will be granted to converter 28, and subsequent monolog traffic will be duplicated and distributed within the local radio sub-network 26.

Following task 146 and when task 144 fails to detect a token grant from group controller 24, a query task 148 is performed to determine if converter 28 has recently received a token release from group controller 24. In the preferred embodiment, a token release from group controller 24, when received at a converter 28, indicates that group controller 24 has released a token previously granted to another radio sub-network 26. In this situation, a task 150 converts the token release message into signaling appropriate to serve as a token release within protocol 38, and transmits the token release to the local radio sub-network 26, where it is received by base station 32 and controller 30. As discussed above in connection with FIG. 5, the token release will be treated as a release of the token previously granted to the local converter 28.

After task 150 and when task 148 fails to detect a token release from group controller 24, program flow loops back to task 114 to continue process 112.

FIG. 8 shows a flow chart of a group control process 152 performed by group controller 24 (FIG. 1) of group radio communication system 20 to manage a common point-to-multipoint communication session involving point-to-multipoint communication sessions in more than one radio sub-network 26. In particular, process 152 is carried out in response to computer software stored in a memory portion (not shown) of group controller 24 and executed by a processor portion (not shown) of group controller 24. Of course, group controller 24 may perform other processes concurrently with process 152.

Process 152 includes a task 154 which filters packets received from data communication network 22 (FIG. 1) according to group ID. Accordingly, the remainder of process 152 is performed for a specified group of subscriber radios 34, which may be located in a variety of radio sub-networks 26. Other instances of process 152 may be implemented for other groups, and one group controller 24 may serve any number of groups.

Following task 154, a query task 156 determines whether packets containing monolog traffic have been received from a radio sub-network 26. As discussed above in connection with FIGS. 5 and 6, when a subscriber monolog originates from a subscriber radio 34, monolog traffic is received at the local base station 32, where it is duplicated and distributed in the local radio sub-network. The duplication and distribution causes the monolog traffic to be received at the local converter 28, where it is converted into a format compatible with protocol 56 and sent to group controller 24.

When such packets are received, a task 158 duplicates and distributes the packets to all non-originating radio sub-networks 26 for the group. In other words, the packets are sent from group controller 24 through data communication network 22 to the converters 28 located in radio sub-networks 26 from which the monolog did not originate. Consequently, a point-to-multipoint monolog gets routed from an originating radio sub-network 26 through group controller 24 to all other radio sub-networks participating in the common point-to-multipoint communication session. Since the monolog is distributed within the originating radio sub-network by the sub-network's controller 30 and base station 32, it need not be distributed back to that radio sub-network by group controller 24.

After task 158 and when task 156 fails to detect monolog traffic, a query task 160 determines whether a token grant message has been received from a radio sub-network 26. As discussed above in connection with FIGS. 5 and 6, a token grant message results when a subscriber radio 34 is granted the token within its radio sub-network by its controller 30, and signaling indicating the grant of the token is passed through converter 28 to group controller 24. When a token grant message is detected, a task 162 resolves any conflict which may be occurring when, for example, substantially concurrent requests for tokens have been granted in multiple radio sub-networks 26. The contention may be resolved by a prioritization scheme which prioritizes by subscriber radio ID, radio sub-network ID, or the like.

After resolving contention in task 162 and selecting a single radio sub-network 26 to be the monolog originator, a task 164 sends the token grant to all non-originating radio sub-networks 26. Since the originating radio sub-network has already granted the token within its domain, no need exists for the token to be returned. As discussed above in connection with FIGS. 5 and 6, when the token grant is sent back through a converter 28, it is translated into a token request. When that token request is received at the converter's radio controller 30, that controller 30 will recognize converter 28 as having the highest priority within the radio sub-network 26 and grant the token request, thereby preventing further token grants until the converter releases the token. In a contention situation where two sub-networks 26 simultaneously grant tokens, one of the two sub-networks 26 will almost instantly withdraw the previous token grant and reissue the grant to its converter 28.

After task 164 and when task 160 fails to detect a token grant, a query task 166 determines whether a token release message has been received from a radio sub-network 26. As discussed above in connection with FIGS. 5 and 6, a token release message results when a subscriber radio 34 that has previously been the monolog originator finishes the monolog and releases the token by signaling within its local radio sub-network 26. This release signaling is repeated to converter 28 and converted into a message that is delivered to group controller 24. When a token release message is detected, a task 168 duplicates and distributes the release message to all non-originating radio sub-networks 26. The token release message need not be distributed back to the originating radio sub-network because the controller 30 in that radio sub-network will have already distributed it.

After task 168 and when task 166 fails to detect a token release message, program flow loops back to task 154 to continue process 152.

In summary, the present invention provides an improved group radio communication system and method which uses interconnected radio sub-networks. The group radio communication system uses an existing packet switched network and existing group radio sub-networks to achieve expanded group connectivity without wasting resources of the existing group radio sub-networks or of the existing packet switched network. Groups can be extended across incompatible radio sub-networks, into remote locations, and to areas where no terrestrial data communication network infrastructure resides. Rapid group session management is provided by having local radio sub-networks control their own groups and by using a packet switched network to deliver information and signaling to the group controller. Call setup processes need not be-performed for each monolog because the packet switched network does not need to reserve communication resources for the point-to-multipoint communication session when no monolog is active.

Although the preferred embodiments of the present invention have been illustrated and described in detail, it will be readily apparent to those skilled in the art that various modifications and equivalents may be made therein without departing from the spirit of the invention or from the scope of the appended claims. For example, those skilled in the art will appreciate that the sequencing and grouping of tasks and the configuration of data formats discussed herein can be greatly altered while achieving equivalent results. Likewise, those skilled in the art will appreciate that the precise scheme used to grant tokens across local radio sub-networks described herein is but one of many schemes which will accomplish equivalent results. These and other changes and modifications are intended to be included within the scope of the present invention.

What is claimed is:

1. A group radio communication system comprising:

a first radio sub-network configured to implement point-to-multipoint communication sessions within said first radio sub-network;

a second radio sub-network configured to implement point-to-multipoint communication sessions within said second radio sub-network; and a group controller in data communication with said first radio sub-network and said second radio sub-network, said group controller being configured to manage a common point-to-multipoint communication session involving said first radio sub-network and said second radio sub-network;

a packet switched data communication network coupled between said first radio sub-network and said group controller and between said second radio sub-network and said group controller;

a radio sub-network controller associated with each of said first and second radio sub-networks and a plurality of subscriber radios in communication with said radio sub-network controller, and each of said radio sub-network controllers is configured to resolve conflicts between substantially concurrent requests from said plurality of subscriber radios in communication with said radio sub-network controller to be origination points for a point-to-multipoint monolog and to provide subscriber traffic distribution to said plurality of subscriber radios in communication with said radio sub-network controller.

2. A group radio communication system as claimed in claim 1 wherein said packet switched data communication network is implemented using switching nodes located in one or more Earth-orbiting satellites.

3. A group radio communication system as claimed in claim 1 wherein:

packets originating from said first radio sub-network are received at said group controller; and said group controller is configured to distribute said packets to said second radio sub-network.

4. A group radio communication system as claimed in claim 3 wherein:

said second radio sub-network has a radio sub-network controller in communication with said group controller and has at least one subscriber radio in communication with said radio sub-network controller; and said radio sub-network controller receives said packets from said group controller and distributes said packets to said at least one subscriber radio.

5. A group radio communication system as claimed in claim 1 wherein:

said group radio communication system additionally comprises a third radio sub-network configured to implement point-to-multipoint communication sessions within said third radio sub-network; and said group controller is configured to receive packets originating from a first one of said first, second, and third radio sub-networks and to distribute said packets to second and third ones of said first, second, and third radio sub-networks.

6. A group radio communication system as claimed in claim 1 wherein:

said first radio sub-network comprises a first converter configured to translate between said first radio sub-network and said packet switched data communication network; and said second radio sub-network comprises a second converter configures to translate between said second radio sub-network and said packet switched data communication network.

7. A group radio communication system as claimed in claim 6 wherein:

said first radio sub-network comprises a first radio sub-network controller and at least one first radio sub-network subscriber radio, said at least one first radio sub-network subscriber radio and said first converter being configured to communicate with said first radio sub-network controller using a communication protocol established for said first radio sub-network; and said second radio sub-network comprises a second radio sub-network controller and at least one second radio sub-network subscriber radio, said at least one second radio sub-network subscriber radio and said second converter being configured to communicate with said second radio sub-network controller using a communication protocol established for said second radio sub-network.

8. A group radio communication system as claimed in claim 7 wherein:

said data communication network is a packet switched data communication network; and said first and second converters are configured as interfaces to said packet switched data communication network.

9. A group radio communication system as claimed in claim 8 wherein said group controller interfaces to said packet switched data communication network.

10. A group radio communication system as claimed in claim 1 wherein said group controller is configured to resolve a conflict between substantially concurrent requests from said first and second radio sub-networks to be an origination point for a point-to-multipoint monolog within said common point-to-multipoint communication session.

11. A group radio communication system as claimed in claim 1 wherein:

said first and second radio sub-networks have overlapping radio coverage areas; and said first and second radio sub-networks have incompatible communication protocols.

12. A group radio communication system as claimed in claim 1 wherein said first and second radio sub-networks have non-overlapping radio coverage area.

13. A method of implementing a common point-to-multipoint communication session involving first and second radio sub-networks, said method comprising:

coupling said first radio sub-network to a packet switched communication network;

coupling said second radio sub-network to said packet switched communication network;

coupling a group controller to said data communication network;

routing a point-to-multipoint monolog from said first radio sub-network through said group controller to said second radio sub-network;

converting said point-to-multipoint monolog into packets for distribution through said packet switched data communication network and said group controller;

receiving said point-to-multipoint monolog at a first converter configured to communicate in said first radio sub-network using a communication protocol established for said first radio sub-network; and transmitting said point-to-multipoint monolog as packets over said packet switched data communication network using a protocol established for said packet switched data communication network.

14. A method as claimed in claim 13 wherein:

said first radio sub-network comprises a first radio sub-network controller and a plurality of first radio sub-network subscriber radios;

said second radio sub-network comprises a second radio sub-network controller and a plurality of second radio sub-network subscriber radios;

said method additionally comprises providing point-to-multipoint communication session management services for said first and second radio sub-networks at said group controller;

said method additionally comprises providing point-to-multipoint communication session management services for said plurality of first radio sub-network subscriber radios at said first radio sub-network controller; and said method additionally comprises providing point-to-multipoint communication session management services for said plurality of second radio sub-network subscriber radios at said second radio sub-network controller.

15. A method as claimed in claim 13 additionally comprising:

implementing said first and second radio sub-networks to have overlapping radio coverage areas; and implementing said first and second radio sub-networks to have incompatible communication protocols.

16. A method as claimed in claim 13 additionally comprising implementing said first and second radio sub-networks to have non-overlapping radio coverage areas.

17. A group radio communication system comprising:

a first radio sub-network configured to implement point-to-multipoint communication sessions within said first radio sub-network, said first radio sub-network having a plurality of first subscriber radios in radio communication with a first sub-network controller and a first converter in radio communication with said first sub-network controller;

a second radio sub-network configured to implement point-to-multipoint communication sessions within said second radio sub-network, said second radio sub-network having a plurality of second subscriber radios in radio communication with a second sub-network controller and a second converter in radio communication with said second sub-network controller;

a packet switched data communication network in data communication with said first and second sub-network controllers, said packet switched data communication network being implemented using switching nodes located in one or more Earth-orbiting satellites; and a group controller in data communication with said packet switched data communication network and said first and second sub-network controllers through said first and second converters, respectively, said group controller being configured to manage a common point-to-multipoint communication session involving said pluralities of first and second subscriber radios.

* * * * *